(12) United States Patent
Xie et al.

(10) Patent No.: US 11,048,950 B2
(45) Date of Patent: Jun. 29, 2021

(54) METHOD AND DEVICE FOR PROCESSING IMAGES OF VEHICLES

(71) Applicant: Hangzhou Hikvision Digital Technology Co., Ltd., Hangzhou (CN)

(72) Inventors: Zhongxian Xie, Hangzhou (CN); Shiliang Pu, Hangzhou (CN); Mingyao Zhou, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 73 days.

(21) Appl. No.: 16/463,951

(22) PCT Filed: Oct. 26, 2017

(86) PCT No.: PCT/CN2017/107872
§ 371 (c)(1),
(2) Date: May 24, 2019

(87) PCT Pub. No.: WO2018/095194
PCT Pub. Date: May 31, 2018

(65) Prior Publication Data
US 2020/0380277 A1    Dec. 3, 2020

(30) Foreign Application Priority Data
Nov. 25, 2016    (CN) .......................... 201611056740.2

(51) Int. Cl.
*G06K 9/00*    (2006.01)
*G06T 7/73*    (2017.01)
*G06K 9/46*    (2006.01)

(52) U.S. Cl.
CPC ....... *G06K 9/00825* (2013.01); *G06K 9/4609* (2013.01); *G06T 7/73* (2017.01); *G06K 2209/15* (2013.01); *G06T 2207/30252* (2013.01)

(58) Field of Classification Search
CPC ............. G06K 9/00797; G06K 9/3246; G06K 9/2028; G06K 9/00825; G08G 1/04;
(Continued)

(56) References Cited

U.S. PATENT DOCUMENTS 5,734,337 A * 3/1998 Kupersmit ................ G01P 3/38
340/936
6,587,755 B1 * 7/2003 Smith ................ G06Q 30/0269
340/928

(Continued)

FOREIGN PATENT DOCUMENTS

| CN | 103402058 A | 11/2013 |
| CN | 103699905 A | 4/2014 |

(Continued)

OTHER PUBLICATIONS

International Search Report for International Application No. PCT/CN2017/107872 dated Jan. 31, 2018.

*Primary Examiner* — Amir Alavi
(74) *Attorney, Agent, or Firm* — Clements Bernard Walker; Lawrence A. Baratta, Jr.

(57) ABSTRACT

An embodiment of the present application provides an image analysis method and device, and the method includes: receiving target information sent by a target image acquisition device; wherein the target information includes at least: a first image acquired by the target image acquisition device, and the identification information of the target image acquisition device; obtaining target area information corresponding to the identification information of the target image acquisition device according to a correspondence between pre-stored identification information of each image acquisition device and respective area information; in the first image, determining a second image corresponding to the target area information, and analyzing the second image. In the embodiment of the present application, only the second (Continued)

image including a specific area of the first image can be analyzed, the size of the second image is smaller when comparing with the first image, therefore the efficiency of analyzing an image can be increased.

17 Claims, 8 Drawing Sheets

(58) Field of Classification Search
CPC ...... G08G 1/0175; G08G 1/017; G08G 1/054; B60R 1/00; G06T 2207/10016; G06T 2207/30256; G06T 7/73
See application file for complete search history.

(56) References Cited

U.S. PATENT DOCUMENTS

| | | | | |
|---|---|---|---|---|
| 6,766,038 B1 * | 7/2004 | Sakuma | ............... | G01P 3/806 340/933 |
| 6,879,263 B2 * | 4/2005 | Pederson | ............. | B60Q 1/2611 340/815.45 |
| 6,888,445 B2 * | 5/2005 | Gotfried | ................. | B60R 25/04 235/382 |
| 6,996,255 B2 * | 2/2006 | Sakuma | ................... | G01P 3/806 382/107 |
| 7,124,006 B2 * | 10/2006 | Davidson | ................ | G01C 21/26 701/36 |
| 7,209,807 B2 * | 4/2007 | Smith | ................ | G06Q 30/0269 701/1 |
| 7,843,313 B2 * | 11/2010 | Bazakos | ................ | G08G 1/207 340/5.7 |
| 10,133,530 B2 * | 11/2018 | Wasserman | ........... | G08G 1/0141 |
| 10,565,866 B2 * | 2/2020 | Gao | ........................ | G08G 1/04 |
| 2009/0208059 A1 | 8/2009 | Geva et al. | | |
| 2009/0208060 A1 | 8/2009 | Wang et al. | | |
| 2014/0036076 A1 | 2/2014 | Nerayoff et al. | | |
| 2017/0046891 A1 * | 2/2017 | Trivelpiece | ........ | G07C 9/00174 |
| 2020/0090509 A1 * | 3/2020 | Dong | ..................... | B60K 35/00 |

FOREIGN PATENT DOCUMENTS

| | | |
|---|---|---|
| CN | 103810696 A | 5/2014 |
| CN | 103854026 A | 6/2014 |
| CN | 104239867 A | 12/2014 |
| CN | 104966049 A | 10/2015 |
| JP | 2016091193 A | 5/2016 |

* cited by examiner

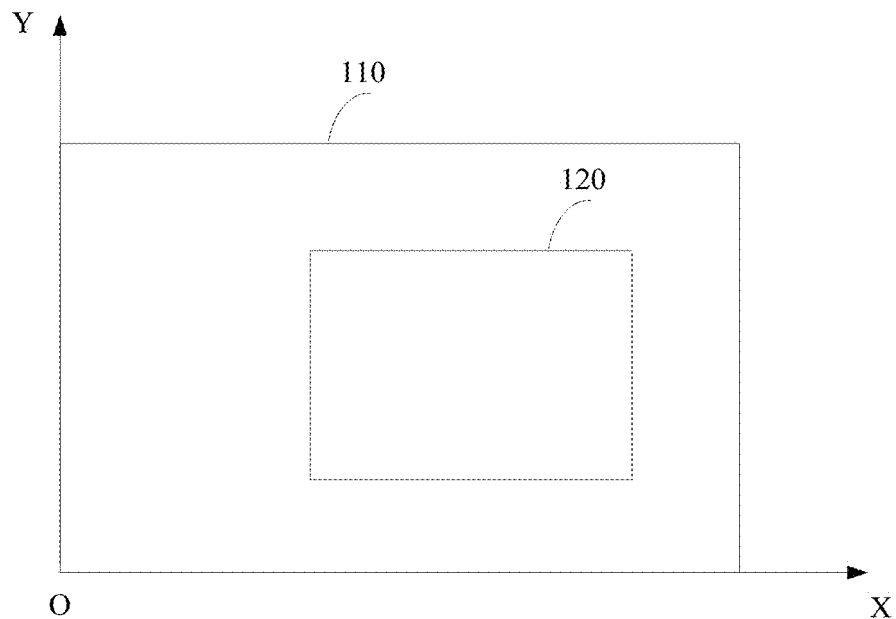

FIG. 1

```
receiving target information sent by a target image acquisition
device; wherein, the target information at least includes: a first
image acquired by the target image acquisition device, and
identification information of the target image acquisition device
```
— S101

```
obtaining, according to a pre-stored correspondence between
identification information of each image acquisition device and
area information, target area information corresponding to the
identification information of the target image acquisition device
```
— S102

```
determining a second image corresponding to the target area
information in the first image, and analyzing the second image
```
— S103

FIG. 2

METHOD AND DEVICE FOR PROCESSING IMAGES OF VEHICLES

The present application claims the priority to a Chinese patent application No. 201611056740.2, filed with China National Intellectual Property Administration on Nov. 25, 2016 and entitled "Image analysis method and device", which is incorporated herein by reference in its entirety.

TECHNICAL FIELD

The present disclosure relates to the field of image processing technology, and in particularly, to an image analysis method and device.

BACKGROUND

In the field of traffic monitoring, image acquisition device is usually installed at intersection, checkpoint, etc. to obtain an image containing vehicles, thereby to obtain relevant license plate information according to the image. Specifically, the image acquisition device may detect an image acquisition area thereof, and when detecting passing of a vehicle, a monitoring image containing a target vehicle is captured. The target vehicle may be a vehicle detected by the image acquisition device.

After the image acquisition device captures an image containing the target vehicle, in order to obtain more information of the target vehicle, such as vehicle brand information, registration place, etc., the image acquisition device may identify a license plate information of the target vehicle, and then send the identified license plate information and the corresponding image to an image analysis system for analysis.

In general, images captured by the image acquisition device may contain multiple vehicles, but only one target vehicle needs to be analyzed. Therefore, after receiving the license plate information and the corresponding image sent by the image acquisition device, the image analysis system may identify a target vehicle in the image according to the license plate information, and then analyze the identified target vehicle.

In the above method, before analyzing the target vehicle, the image analysis system first analyzes the entire image to identify the target vehicle contained therein. This will take a long time, resulting in a low efficiency in analyzing an image.

SUMMARY

The purpose of the embodiment of the present application is to provide an image analysis method and device, to increase efficiency of analyzing an image. Specifically, the technical solutions are as follows.

In a first aspect, an embodiment of the present application provides an image analysis method including:

receiving target information sent by a target image acquisition device; wherein, the target information at least includes: a first image acquired by the target image acquisition device, and identification information of the target image acquisition device;

obtaining, according to a pre-stored correspondence between identification information of each image acquisition device and area information, target area information corresponding to the identification information of the target image acquisition device; and determining a second image corresponding to the target area information in the first image, and analyzing the second image.

Optionally, the target information further comprises: a first license plate information of a target vehicle in the first image; analyzing the second image at least comprises:

identifying second license plate information in the second image;

the method further comprises:

determining whether the first license plate information is the same as the second license plate information;

if yes, analyzing the second image to determine first area information of the second image, and storing correspondingly the identification information of the target image acquisition device, the first area information of the second image and a first determining result, which indicates that the first license plate information is the same as the second license plate information;

if not, analyzing the first image to determine first area information of the first image, and storing correspondingly the identification information of the target image acquisition device, the first area information of the first image and a second determining result, which indicates that the first license plate information is different from the second license plate information.

Optionally, determining the first area information of the second image comprises:

identifying in the second image a target vehicle whose license plate information is the first license plate information;

determining position information of an area in the second image occupied by the target vehicle, and determining the position information as the first area information of the second image.

Optionally, determining the first area information of the first image comprises:

identifying in the first image a target vehicle whose license plate information is the first license plate information;

determining position information of an area in the first image occupied by the target vehicle, and determining the position information as the first area information of the first image.

Optionally, the method further includes:

determining, at a set time interval, whether the number of the second determining results stored during a first preset time period is greater than a first preset threshold;

if yes, updating area information corresponding to the identification information of the target image acquisition device according to the identification information of the target image acquisition device and the first area information of the first image corresponding to the second determining results stored during a second preset time period;

if not, updating area information corresponding to the identification information of the target image acquisition device according to the identification information of the target image acquisition device and the first area information of the second image corresponding to the first determining results stored during a third preset time period.

Optionally, updating the area information corresponding to the identification information of the target image acquisition device according to the identification information of the target image acquisition device and the first area information of the first image corresponding to the second determining results stored during a second preset time period comprises:

obtaining, from the second determining results stored during the second preset time period, first area information of multiple first images corresponding to the identification information of the target image acquisition device;

determining second area information based on a statistical result for the first area information of the multiple first images or based on a feature matching result for the first area information of the multiple first images; and updating, according to the determined second area information, area information corresponding to the identification information of the target image acquisition device.

Optionally, updating area information corresponding to the identification information of the target image acquisition device according to the identification information of the target image acquisition device and the first area information of the second image corresponding to the first determining results stored during a third preset time period comprises:

obtaining, from the first determining results stored during the third preset time period, first area information of multiple second images corresponding to the identification information of the target image acquisition device;

determining second area information based on a statistical result for the first area information of the multiple second images or based on a feature matching result for the first area information of the multiple second images; and updating, according to the determined second area information, area information corresponding to the identification information of the target image acquisition device.

Optionally, pre-storing a correspondence between identification information of each image acquisition device and area information comprises:

receiving, for each image acquisition device, a third image, third license plate information of a target vehicle included in the third image, and identification information of the image acquisition device sent by the image acquisition device;

identifying in the third image a target vehicle whose license plate information is the third license plate information, determining position information of an area in the third image occupied by the target vehicle, and determining the position information as initial area information of the third image;

storing a correspondence between the identification information of the image acquisition device and the initial area information; and determining and storing area information corresponding to the image acquisition device according to initial area information corresponding to the identification information of the image acquisition device, when the number of pieces of the initial area information corresponding to the image acquisition device is greater than a second preset threshold.

In a second aspect, an embodiment of the present application provides an image analysis apparatus including:

a first receiving module, configured for receiving target information sent by a target image acquisition device; wherein, the target information at least comprises: a first image acquired by the target image acquisition device, and identification information of the target image acquisition device;

an execution module, configured for obtaining, according to a pre-stored correspondence between identification information of each image acquisition device and area information, target area information corresponding to the identification information of the target image acquisition device; and an analyzing module, configured for determining a second image corresponding to the target area information in the first image, and analyzing the second image.

Optionally, the target information further comprises: a first license plate information of a target vehicle in the first image; the analyzing module is configured for identifying second license plate information in the second image;

the apparatus further comprises:

a first determining module, configured for determining whether the first license plate information is the same as the second license plate information;

a first storing module, configured for, when a determining result from the first determining module is yes, analyzing the second image to determine first area information of the second image, and storing correspondingly the identification information of the target image acquisition device, the first area information of the second image and a first determining result, which indicates that the first license plate information is the same as the second license plate information;

a second storing module, configured for, when a determining result from the first determining module is no, analyzing the first image to determine first area information of the first image, and storing correspondingly the identification information of the target image acquisition device, the first area information of the first image and a second determining result, which indicates that the first license plate information is different from the second license plate information.

Optionally, the first storing module includes:

a first identifying sub-module, configured for identifying in the second image a target vehicle whose license plate information is the first license plate information;

a first determining sub-module, configured for determining position information of an area in the second image occupied by the target vehicle, and determining the position information as the first area information of the second image.

Optionally, the second storing module includes:

a second identifying sub-module, configured for identifying in the first image a target vehicle whose license plate information is the first license plate information;

a second determining sub-module, configured for determining position information of an area in the first image occupied by the target vehicle, and determining the position information as the first area information of the first image.

Optionally, the apparatus further includes:

a second determining module, configured for determining, at a set time interval, whether the number of the second determining results stored during a first preset time period is greater than a first preset threshold;

a first updating module, configured for, when a determining result from the second determining module is yes, updating area information corresponding to the identification information of the target image acquisition device according to the identification information of the target image acquisition device and the first area information of the first image corresponding to the second determining results stored during a second preset time period;

a second updating module, configured for, when a determining result from the second determining module is no, updating area information corresponding to the identification information of the target image acquisition device according to the identification information of the target image acquisition device and the first area information of the second image corresponding to the first determining results stored during a third preset time period.

Optionally, the first updating module includes:

a first obtaining sub-module, configured for obtaining, from the second determining results stored during the second preset time period, first area information of multiple first images corresponding to the identification information of the target image acquisition device;

a third determining sub-module, configured for determining second area information based on a statistical result for the first area information of the multiple first images or based on a feature matching result for the first area information of the multiple first images; and a first updating sub-module, configured for updating, according to the determined second area information, area information corresponding to the identification information of the target image acquisition device.

Optionally, the second updating module includes:

a second obtaining sub-module, configured for obtaining, from the first determining results stored during the third preset time period, first area information of multiple second images corresponding to the identification information of the target image acquisition device;

a fourth determining sub-module, configured for determining second area information based on a statistical result for the first area information of the multiple second images or based on a feature matching result for the first area information of the multiple second images; and a second updating sub-module, configured for updating, according to the determined second area information, area information corresponding to the identification information of the target image acquisition device.

Optionally, the apparatus further includes:

a second receiving module, configured for receiving, for each image acquisition device, a third image, third license plate information of a target vehicle included in the third image, and identification information of the image acquisition device sent by the image acquisition device;

a processing module, configured for identifying in the third image a target vehicle whose license plate information is the third license plate information, determining position information of an area in the third image occupied by the target vehicle, and determining the position information as initial area information of the third image;

a third storing module, configured for storing a correspondence between the identification information of the image acquisition device and the initial area information; and a fourth storing module, configured for determining and storing area information corresponding to the image acquisition device according to initial area information corresponding to the identification information of the image acquisition device, when the number of pieces of the initial area information corresponding to the image acquisition device stored by the third storing module is greater than a second preset threshold.

In a third aspect, the application provides an electronic device, including:

a processor and a memory;

the memory stores executable program codes;

the processor runs a program corresponding to the executable program codes by reading the executable program codes stored in the memory to implement the image analysis method described in the first aspect of the present application.

An embodiment of the present application provides an image analysis method and apparatus. The method includes: receiving target information sent by a target image acquisition device; wherein, the target information at least comprises: a first image acquired by the target image acquisition device, and identification information of the target image acquisition device; obtaining, according to a pre-stored correspondence between identification information of each image acquisition device and area information, target area information corresponding to the identification information of the target image acquisition device; and determining a second image corresponding to the target area information in the first image, and analyzing the second image.

In the embodiments of the present application, for one image acquisition device, an area where target vehicles in the acquired images are located is usually relatively fixed. Therefore, a correspondence between identification information of each image acquisition device and area information can be obtained in advance. The above area information includes position information of an area where a target vehicle in the image acquired by each image acquisition device is located. After an image sent by a target image acquisition device is received, a second image corresponding to target area information may be determined according to target area information corresponding to a target image acquisition device, and only the second image is analyzed. Since the size of the second image is smaller than the first image, the efficiency of analyzing an image can be increased.

BRIEF DESCRIPTION OF THE DRAWINGS

In order to more clearly describe the technical solution of the embodiments of the application and the prior art, drawings needed in the embodiments and the prior art will be briefly described below. Obviously, the drawings described below are for only some embodiments of the present application, one of ordinary skills in the art can also obtain other drawings based on these drawings without any creative efforts.

FIG. 1 is a schematic diagram of an image acquisition area and a detection area for an image acquisition device.

FIG. 2 is a flowchart of an image analysis method according to an embodiment of the present application.

DETAILED DESCRIPTION

Figure 3:
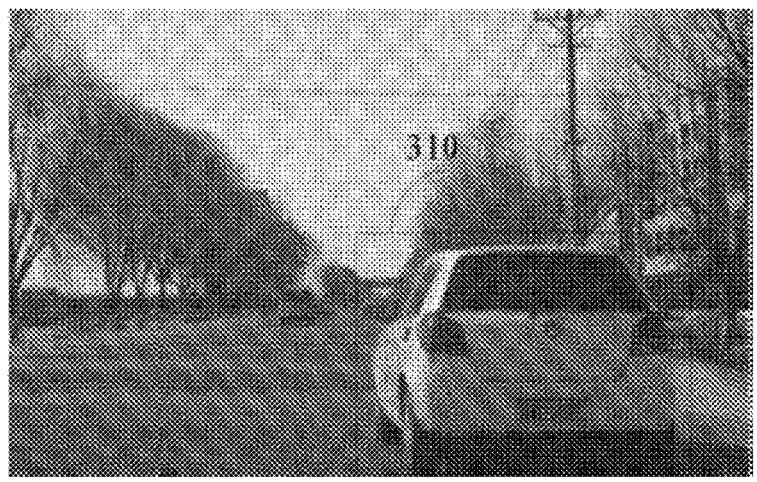
FIG. 3(a) is a schematic diagram of a first image acquired by a target image acquisition device according to an embodiment of the present application.
FIG. 3(b) is a schematic diagram of a second image determined according to the first image shown in FIG. 3(a) and target area information.
Figure 3:
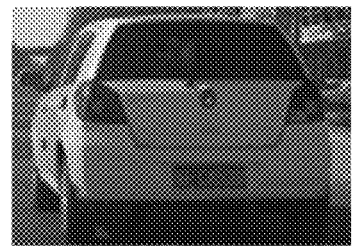

In order to increase efficiency of analyzing an image, an embodiment of the present application provides an image analysis method and device.

The technical solution of the application will be described in detail with reference to the drawings of embodiments of the present application. Obviously, the embodiments described are only some instead of all of the embodiments of the present application. All other embodiments obtained by those of ordinary skills in the art based on the embodiments herein without any creative efforts are within the scope of the present application.

It should be noted that, the embodiments in the present application and the features in the embodiments may be combined with each other without conflict. The present application will be described in detail below with reference to the accompanying drawings.

In the field of traffic monitoring, an image acquisition device, which is installed at intersection, checkpoint, etc. may detect an image acquisition area thereof, and when detecting passing of a vehicle, a monitoring image containing a target vehicle is captured. Moreover, in general, for each image acquisition device, position, capturing angle and other parameters thereof are determined when being installed, and therefore, the image acquisition area thereof is relatively fixed.

In one embodiment of the present application, in the processing of detecting vehicles, the image acquisition device detects vehicles in a relatively fixed and small detection area in the acquisition area of the image acquisition device, rather than in the entire image acquisition area. Only when a vehicle is passing through a detection area of the image acquisition device, the image acquisition device can detect the passing of the vehicle, and when a vehicle is passing through an area outside of the detection area of the image acquisition device, the image acquisition device cannot detect the vehicle. That is to say, the detection area is the area of interest of the image acquisition device, and is also the area where the target vehicle in the image acquired by the image acquisition device is located.

Correspondingly, an image acquired by the image acquisition device also includes an image acquisition area and a detection area. Wherein, the image acquisition area may be an entire image area, and the detection area is an image area corresponding to an actual detection area of the image acquisition device.

Alternatively, in another embodiment, when analyzing the image acquisition area, the detection area may be used as a preferred area for vehicle detection, and the non-detection area within the image acquisition area may be used as a secondary area for vehicle detection.

As shown in FIG. 1, the image acquisition area of the image acquisition device may be an area 110, and the detection area may be an area 120. As can be seen from FIG. 1, a range of the image acquisition area 110 of the image acquisition device is generally large, while a range of the detection area 120 is relatively small.

In an embodiment of the present application, in order to improve the efficiency of analyzing an image, for each image acquisition device, the area information may be determined in advance according to images acquired by each image acquisition device. That is, position information of the detection area in images acquired by the image acquisition device is determined, and a correspondence between the identification information of each image acquisition device and the area information is correspondingly storied.

Specifically, the area information may be determined according to images acquired by each image acquisition device and stored by an image analysis system; alternatively, the area information may be determined according to images acquired by each image acquisition device and stored by another self-learning system. When the correspondence between the identification information of each image acquisition device and the area information is stored by a self-learning system, the image analysis system may establish a connection relationship with the self-learning system. In an embodiment of the present application, taking the image analysis system as an example, which determines the area information according to the image acquired by each image acquisition device and stores the same, to illustrate an image analysis method according to this embodiment.

Moreover, the correspondence between the identification information of each image acquisition device and the area information may be stored locally in the image analysis system, or may be stored in an external device that establishes a connection relationship with the image analysis system.

When the correspondence between the identification information of each image acquisition device and the area information is stored, a coordinate system may be set for images acquired by each image acquisition device. As shown in FIG. 1, one vertex of an image may be determined as the origin O, and X axis, Y axis may be determined. When the area information corresponding to each image acquisition device is stored, a start point and an end point of the detection area in the X direction, and a start point and an end point of the detection area in the Y direction may be stored correspondingly. Wherein, the start points and the end points in the X direction and in the Y direction may be stored in units of pixels.

The correspondence between the identification information of each image acquisition device and the area information stored by the image analysis system may be as shown in Table 1:

TABLE 1

| identification information | area information |
|---|---|
| 01 | X(120,143), Y(12,58) |
| 02 | X(112,232), Y(21,53) |
| 03 | X(23,83), Y(14,49) |
| ... | ... |

An embodiment of the present application provides an image analysis method, as shown in FIG. 2. The method may include:

S101: receiving target information sent by a target image acquisition device; wherein, the target information at least includes: a first image acquired by the target image acquisition device, and identification information of the target image acquisition device.

The method according to the embodiment of the present application may be applied in an image analysis system. Specifically, the image analysis system may operate in an electronic device, such as a desktop computer, a portable computer, a smart mobile terminal, or the like.

In an embodiment of the present application, in order to perform traffic monitoring, an image acquisition device may be installed at intersection, checkpoint, etc. where monitoring is required. Wherein, the above described image acquisition device may be a dome camera, a camera, a snap camera, or the like, which is not limited in this embodiment of the present application.

Also, a wired or wireless connection may be established between the image acquisition device and the image analysis system so that the image acquisition device may send the acquired images to the image analysis system. For example, a connection between the image acquisition device and the image analysis system may be established through wireless connection methods such as WIFI (Wireless Fidelity), NFC (Near Field Communication), Bluetooth, etc. which is not limited in this embodiment of the present application.

It should be noted that, the method according to the embodiment of the present application may analyze the images acquired by each image acquisition device. The embodiment takes only any one image acquisition device as an example, to illustrate the image analysis method according to the embodiment of the present application. Also, for the convenience of description, the image acquisition device in the embodiment of the present application may be referred to as a target image acquisition device.

In an embodiment of the present application, the target image acquisition device may detect whether there is a vehicle passing through the detection area, and when detecting passing of a vehicle, a first image including the detected target vehicle may be acquired. Moreover, the target acquisition device may sent the first image acquired by itself and its identification information to the image analysis system, so that the image analysis system obtains more information of the target vehicle.

Alternatively, if a vehicle detection device such as an infrared sensing device may be disposed in the vicinity of the detection area, the target acquisition device may also acquire an image of the detection area when receiving an indication signal from the vehicle detection device. For example, when the target vehicle passes through the infrared ray emitted by the infrared sensing device, it is determined that the target vehicle is about to enter the detection area, and thus the infrared sensing device sends an indication signal to the vehicle detection device to instruct the target acquisition device to acquire an image. Thus, the target acquisition device acquires an image (such as a snap camera captures an image) while the target vehicle is passing through the detection area, and the target acquisition device may acquire the first image of the target vehicle.

Alternatively, a sensing device such as a weight sensor may be disposed on the road surface in the vicinity of the detection area. Once a vehicle drives over the road surface, the sensing device instructs the target acquisition device (such as a camera) to acquire video or images, and thus acquire the first image of the target vehicle.

Therefore, in an embodiment of the present application, the image analysis system may receive target information sent by a target image acquisition device; wherein, the target information at least includes: a first image acquired by the target image acquisition device, and identification information of the target image acquisition device. For example, the identification information of the target image acquisition device included in the target information received by the image analysis system may be: 02, and the first image included in the target information received by the image analysis system may be as shown in FIG. 3(a).

S102: obtaining, according to a pre-stored correspondence between identification information of each image acquisition device and area information, target area information corresponding to the identification information of the target image acquisition device.

In an embodiment of the present application, after obtaining the target information sent by the target image acquisition device, the image analysis system may obtain target area information corresponding to the identification information of the target image acquisition device according to the pre-stored correspondence between identification information of each image acquisition device and area information. Specifically, the image analysis system may search for the same identification information as the identification information of the target image acquisition device in the identification information of each image acquisition device, and then determine the area information corresponding to the identified identification information as the target area information.

For example, in a case that a correspondence between the identification information of each image acquisition device and area information acquired by image analysis system is as shown in Table 1, and the identification information of the target image acquisition device is 02, the obtained target area information corresponding to the identification information of the target image acquisition device is: X (112, 232), Y (21, 53).

S103: determining a second image corresponding to the target area information in the first image, and analyzing the second image.

In an embodiment of the present application, after the image analysis system obtaining the target area information that matches the target image acquisition device, the image analysis system may determine a second image corresponding to the target area information in the first image, and analyze the second image.

Specifically, the image analysis system may determine an area corresponding to the target area information in the first image, and determine an image including this area as the second image for analyzing.

For example, in a case that the first image acquired by the image analysis system is as shown in FIG. 3(a), and the identified target area information is: X (112, 232), Y (21, 53), the image analysis system may determine in the first image an area with a range from 112 pixels to 232 pixels in the X-axis direction and from 21 pixels to 53 pixels in the Y-axis direction as the area corresponding to the target area information, such as the area 310 in FIG. 3(a). Thereby, an image including this area may be determined as the second image. The second image determined by the image acquisition device may be as shown in FIG. 3(b).

The second image may be an image including a target vehicle, and may be also an image only including a license plate.

When analyzing the second image, an electronic device for example may identify information of a target vehicle included in the second image, such as vehicle brand information, registration place, etc., which is not limited in this embodiment of the present application.

In an embodiment of the present application, for one image acquisition device, an area where target vehicles in the acquired images are located is usually relatively fixed. Therefore, a correspondence between identification information of each image acquisition device and area information can be obtained in advance. The above area information includes position information of an area where a target vehicle in the image acquired by each image acquisition device is located. After an image sent by a target image acquisition device is received, a second image corresponding to target area information may be determined according to target area information corresponding to a target image acquisition device, and only the second image is analyzed. Since the size of the second image is smaller than the first image, the efficiency of analyzing an image can be increased.

As an implementation of the embodiment of the present application, in a case that the image analysis system pre-stores a correspondence between the identification information of the target image acquisition device and the target area information, if the target area information involves information of a vehicle, and the vehicle included in the second image corresponding to the target area information is of a larger size, and a vehicle with such a large size does not appear again for a long period of time, it may result in inaccuracy of the target area information corresponding to the stored identification information of the target image acquisition device. In some cases, even if the target area information is information of the license plate, the second image corresponding to the target area information contains only a license plate rather than the entire vehicle, since the size of the license plate is relatively fixed, when the detection area of the target image acquisition device is changed due to some external factors such as wind, the pre-stored target area information corresponding to the target image acquisition device may not be accurate.

Therefore, in an embodiment of the present application, the image analysis system may optimize and update the area information corresponding to the target image acquisition device, to ensure an accuracy of the area information corresponding to the target image acquisition device, so as to further increase the efficiency of analyzing an image.

Figure 4:
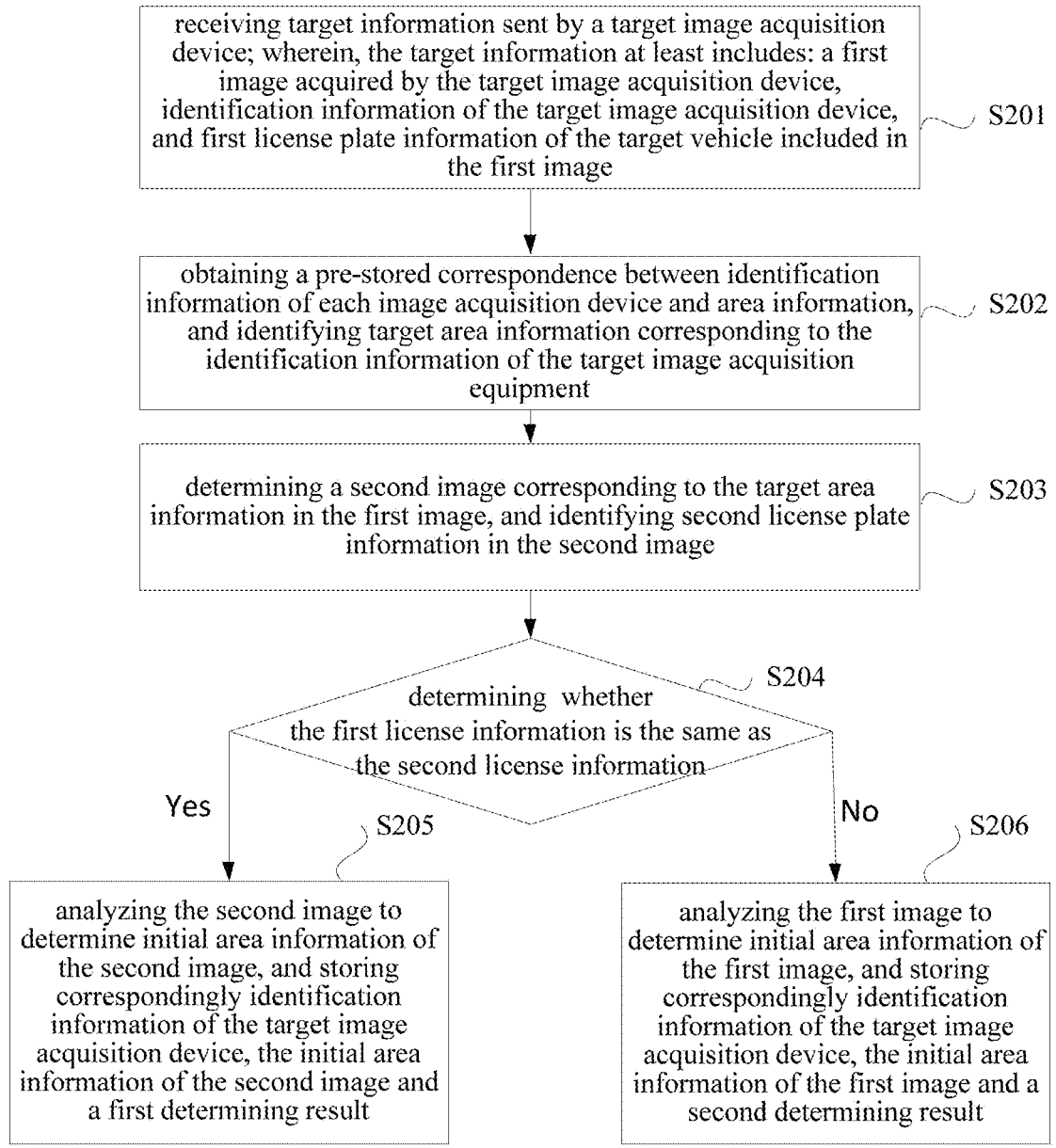
FIG. 4 is another flowchart of an image analysis method according to an embodiment of the present application.

As shown in FIG. 4, an image analysis method according to an embodiment of the present disclosure may include:

S201: receiving target information sent by a target image acquisition device; wherein, the target information at least includes: a first image acquired by the target image acquisition device, identification information of the target image acquisition device, and first license plate information of the target vehicle included in the first image.

In an embodiment of the present application, when the target image acquisition device detects that there is a target vehicle in the detection area, the target image acquisition device may identify license plate information of the target vehicle and send it to the image analysis system, so that the image analysis system identifies the corresponding target vehicle according to the license plate information and analyzes the target vehicle.

Wherein, the image acquisition device may identify the license plate information of the target vehicle included in the first image by using any image recognition method, which is not described in this embodiment of the present application.

Therefore, in the embodiment of the present application, the target information received by the image analysis system may include: a first image acquired by the target image acquisition device, identification information of the target image acquisition device, and first license plate information of the target vehicle included in the first image.

S202: obtaining, according to a pre-stored correspondence between identification information of each image acquisition device and area information, target area information corresponding to the identification information of the target image acquisition device.

This step is basically the same as step S102 in the embodiment shown in FIG. 2, and details are not described here.

S203: determining a second image corresponding to the target area information in the first image, and identifying second license plate information in the second image.

In an embodiment of the present application, when the image analysis system analyzes the second image, the image analysis system may at least identify the second license plate information in the second image, to determine whether the target area information is accurate according to the second license plate information and the first license plate information of the target vehicle sent by the target image acquisition device.

S204: determining whether the first license plate information is the same as the second license plate information; if yes, executing step S205; if no, executing step S206.

After the image analysis system identifies the second license plate information of the vehicle included in the second image, the image analysis system may determine whether the first license plate information sent by the target image acquisition device is the same as the second license plate information.

S205: analyzing the second image to determine first area information in the second image, and storing correspondingly identification information of the target image acquisition device, the first area information in the second image and a first determining result, which indicates that the first license plate information is the same as the second license plate information.

When the image analysis system determines that the first license plate information is the same as the second license plate information, it indicates that the pre-stored area information corresponding to the target image acquisition device is accurate.

However, the detection area corresponding to the pre-stored area information corresponding to the target image acquisition device may be larger than an actual detection area of the target image acquisition device. Therefore, the image analysis system may analyze the second image to determine first area information of the second image. Wherein, the first area information of the second image may be position information of an area where the vehicle in the second image is located, or may be position information of an area where the license plate in the second image is located.

For example, the image analysis system may identify in the second image a target vehicle with the same license plate information as the first license plate information; and determine position information of an area occupied by the target vehicle in the second image, and determine the position information as the first area information of the second image. Alternatively, the image analysis system may identify in the second image a license plate with the same license plate information as the first license plate information; and determine position information of an area occupied by the target vehicle in the second image, and determine the position information as the first area information of the second image. Wherein, a format of the first area information stored by the image analysis system may be the same as a format of the pre-stored area information.

After determining the first area information of the second image, the image analysis system may correspondingly store the identification information of the target image acquisition device, the first area information of the second image, and a first determining result, so as to optimize and update the area information corresponding to the target image acquisition device according to the stored information, wherein the first determining result indicates that the first license plate information is the same as the second license plate information.

S206: analyzing the first image to determine first area information of the first image, and correspondingly storing the identification information of the target image acquisition device, the first area information of the first image and a second determining result, which indicates that the first license plate information is different from the second license plate information.

When the image analysis system determines that the first license plate information is different from the second license plate information, it indicates that the pre-stored area information corresponding to the target image acquisition device is not accurate. In this case, the image analysis system may analyze the entire first image to determine first area information of the first image. Wherein, the first area information of the first image may be position information of an area where the vehicle in the first image is located, or may be position information of an area where the license plate in the first image is located.

For example, the image analysis system may identify in the first image a target vehicle with the same license plate information as the first license plate information; and determine position information of an area occupied by the target vehicle in the first image, and determine the position information as first area information of the second image. Alternatively, the image analysis system may identify in the first image a license plate with the same license plate information as the first license plate information; and determine position information of an area occupied by the target vehicle in the first image, and determine the position information as first area information of the first image.

After determining the first area information of the first image, the image analysis system may correspondingly store the identification information of the target image acquisition device, the first area information of the first image, and a second determining result, so as to optimize and update the area information corresponding to the target image acquisition device according to the stored information, wherein the second determining result indicates that the first license plate information is different from the second license plate information.

In the embodiment, the image analysis system may obtain first license plate information of the target vehicle sent by the target image acquisition device, and identify second license plate information in the second image; when the first license plate information is the same as the second license plate information, first area information of the second image is determined and stored; when the first license plate information is different from the second license plate information, the first area information of the first image is determined and stored; thereby, area information corresponding to the target image acquisition device can be optimized and updated according to the stored information.

As an implementation of the embodiment of the present application, when the image analysis system pre-determines and pre-stores the correspondence between each image acquisition device and respective area information, the image analysis system may periodically update area information corresponding to each image acquisition device. Similarly, when the self-learning system pre-determines and pre-stores the correspondence between each image acquisition device and respective area information, the self-learning system may also periodically update area information corresponding to each image acquisition device in a similar manner.

Figure 5:
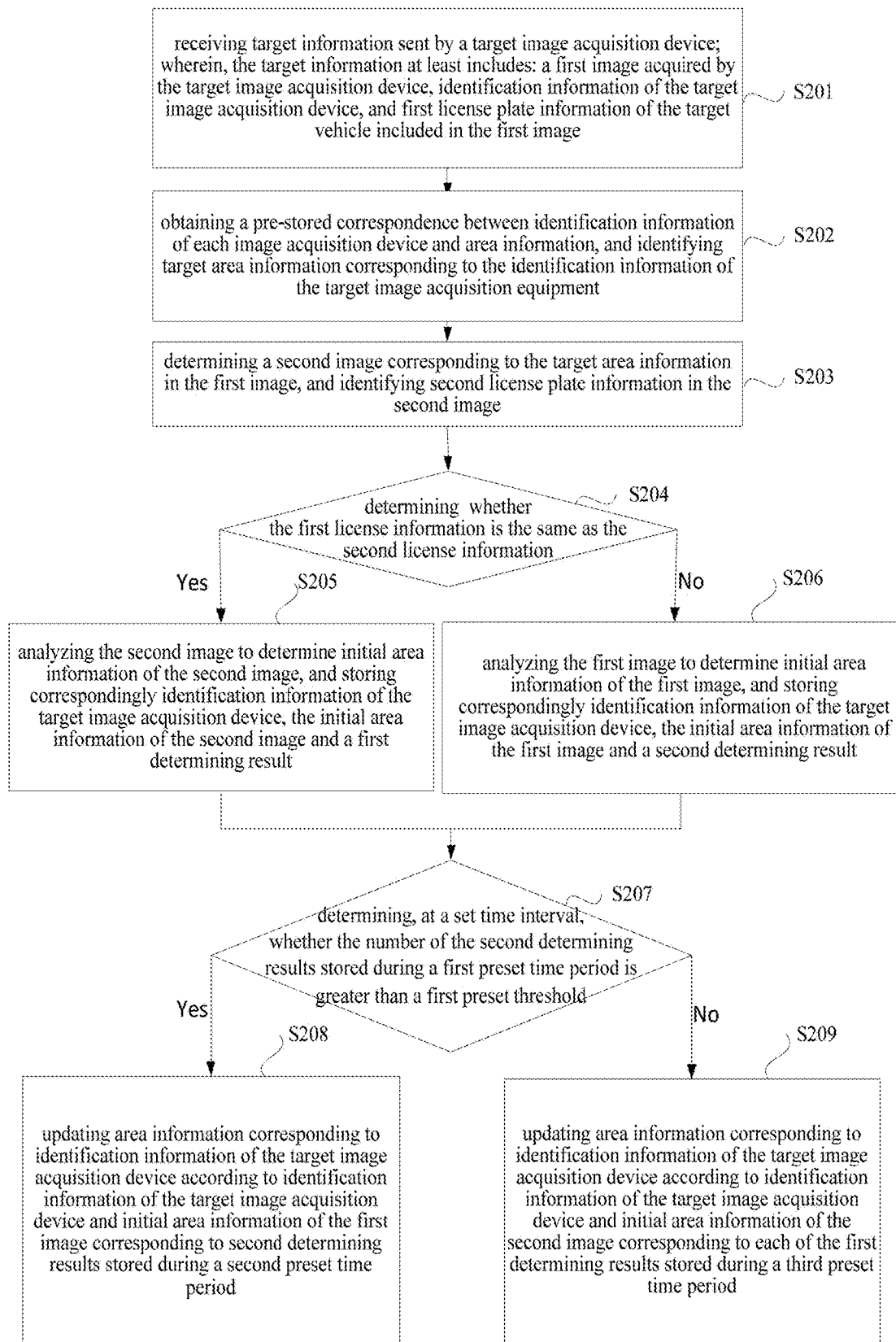
FIG. 5 is another flowchart of an image analysis method according to an embodiment of the present application.

On the basis of the embodiment shown in FIG. 4, the image analysis method according to the embodiment of the present application, as shown in FIG. 5, may further include:

S207: determining, at a set time interval, whether the number of the second determining results stored during a first preset time period is greater than a first preset threshold; if yes, executing step S208, if not, executing step S209.

In an embodiment of the present application, the image analysis system may determine, at a set time interval, such as every 2 minutes, 5 minutes, 10 minutes, etc., whether the number of second determining results stored during the first preset time period is greater than a first preset threshold. The first preset time period described above may be, for example, 2 hours, 5 hours, 12 hours, etc., and the first preset threshold may be, for example, 100, 200, 300, etc.

S208: updating area information corresponding to identification information of the target image acquisition device according to identification information of the target image acquisition device and first area information of the first image corresponding to second determining results stored during a second preset time period.

When the image analysis system determines that the number of the second determining results stored during the first preset time period is greater than the first preset threshold, it indicates that the frequency for failing to identify the first license plate information from the second image during the first preset time period was grater, and thus it can be determined that the accuracy of the area information corresponding to the target image acquisition device may be decreased or changed. In this case, the area information corresponding to the stored target image acquisition device may be updated.

Specifically, the image analysis system may obtain, from the second determining results stored during the second preset time period, the first area information of multiple first images corresponding to identification information of the target image acquisition device, and then determining the second area information based on a statistical result for the first area information of the multiple first images, or based on a feature matching result for the first area information of the multiple first images, and update area information corresponding to identification information of the target image acquisition device according to the determined second area information, wherein, the second preset time period and may or may not be the same as the first preset time period.

Figure 6:
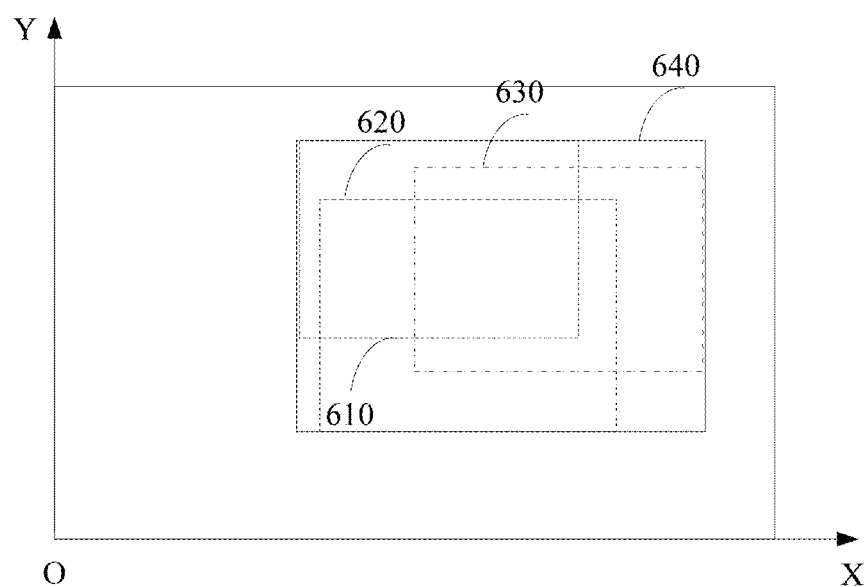
FIG. 6 is a schematic diagram of determining area information based on each initial area information according to an embodiment of the present application.

In one implementation, the image analysis system determining the second area information based on the statistical result for the first area information of the multiple first images may include firstly determining first areas respectively corresponding to each first area information, and then determining a second area covering the first areas, and determining position information of the second area as the second area information. As shown in FIG. 6, when the first areas respectively corresponding to multiple first area information are area 610, 620 and 630 respectively, the determined second area corresponding to the second area information may be area 640.

The image analysis system may further count first area information with the highest frequency of occurrence in the multiple first area information, and determine that first area information as second area information. Alternatively, the image analysis system may determine second area with the highest overlap rate in first area corresponding to the multiple first area information, and determine position information of that second area as second area information. Alternatively, the image analysis system may determine a center point of a first area corresponding to each first area information, then determining a second area with a center of the center point and a preset size of a license plate, and determine position information of the second area as second area information.

In one implementation, the image analysis system determining the second area information based on the feature matching result of the first area information of the multiple first images may include performing a feature matching on the first area information of the multiple first images based on a Scale Invariant Feature Transform (SIFT) algorithm and takes the feature matching result as the second area information.

S209: updating area information corresponding to identification information of the target image acquisition device according to identification information of the target image acquisition device and first area information of the second image corresponding to each of the first determining results stored during a third preset time period.

When the image analysis system determines that the number of the second determining results stored during the first preset time period is not greater than a first preset threshold, it is indicated that the frequency for failing to identify the first license plate information from the second image during the first preset time period was less, and thus it can be determined that the accuracy of the area information corresponding to the target image acquisition device is accurate.

In this case, the image analysis system may further optimize the area information corresponding to the target image acquisition device. For example, the image analysis system may obtain, from the first determining results stored during the third preset time period, the first area information of multiple second images corresponding to identification information of the target image acquisition device, then determine the second area information based on a statistical result for the first area information of the multiple second images, or based on a feature matching result for the first area information of the multiple second images, and update area information corresponding to identification information of the target image acquisition device according to the determined second area information. Wherein, the third preset time period may or may not be the same as the first preset time period.

In one implementation, the image analysis system determining the second area information based on the statistical result for the first area information of the multiple second images may include firstly determining first areas respectively corresponding to each first area information, and then determining a second area covering the first areas, and determining position information of the second area as the second area information.

The image analysis system may further count first area information with the highest frequency of occurrence in the multiple first area information, and determine that first area information as second area information. Alternatively, the image analysis system may determine second area with the highest overlap rate in first area corresponding to the multiple first area information, and determine position information of that second area as second area information. Alternatively, the image analysis system may determine a center point of a first area corresponding to each first area information, then determining a second area with a center of the center point and a preset size of a license plate, and determine position information of the second area as second area information.

In one implementation, the image analysis system may perform a feature matching on the first area information of the multiple second images based on SIFT algorithm and take the feature matching result as second area information.

In the embodiment of the present application, the image analysis system may optimize and update the stored area information corresponding to each image acquisition device according to the stored first area information of the first image or the first area information of the second image, thereby to ensure the accuracy of the area information corresponding to each image acquisition device and to increase the efficiency of analyzing an image.

Figure 7:
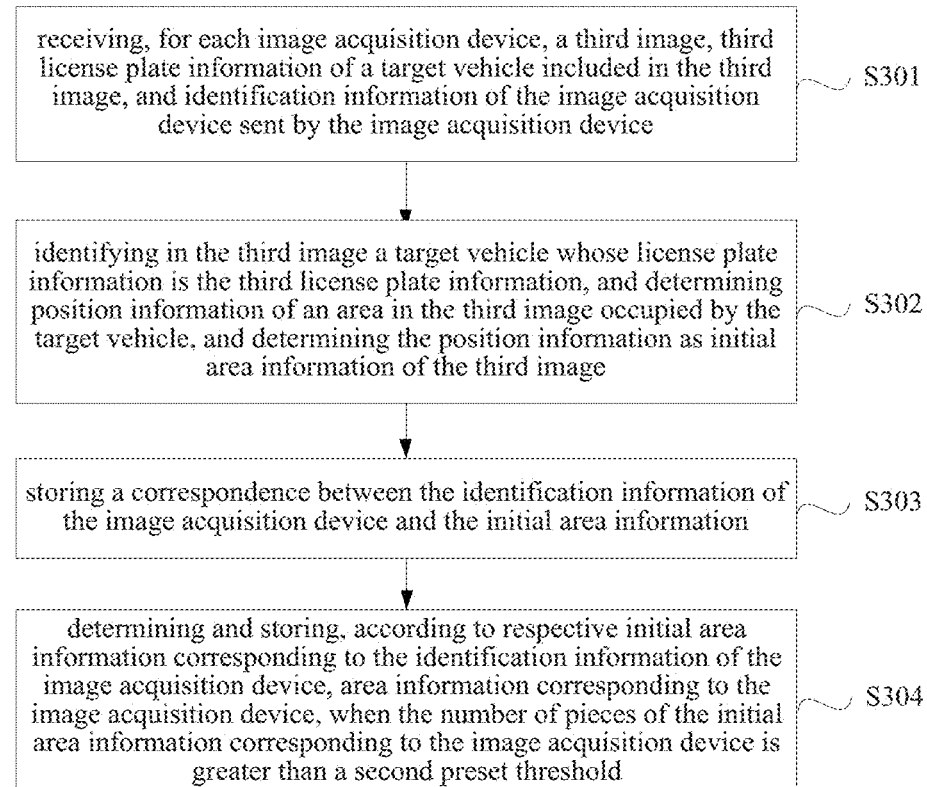
FIG. 7 is another flowchart of an image analysis method according to an embodiment of the present application.

In an embodiment of the present application, the image analysis system may pre-store a correspondence between each image acquisition device and respective area information. Specifically, as shown in FIG. 7, the image analysis method according to the embodiment of the present disclosure may further include:

S301: receiving, for each image acquisition device, a third image, third license plate information of a target vehicle included in the third image, and identification information of the image acquisition device sent by the image acquisition device.

In an embodiment of the present application, an image analysis system may receive, for each image acquisition device, a third image sent by the image acquisition device, third license plate information of a target vehicle included in the third image, and identification information of the image acquisition device.

Wherein, the third license plate information is identified by the image acquisition device from the third image. For example, the image acquisition device may detect a target vehicle in an area corresponding to the third image according to the detection area of the image acquisition device, and identify the third license plate information of the target vehicle.

S302: identifying in the third image a target vehicle whose license plate information is the third license plate information, and determining position information of an area in the third image occupied by the target vehicle, and determining the position information as initial area information of the third image.

After receiving the third image and the third license plate information sent by the image acquisition device, the image analysis system may identify in the third image a target vehicle whose license plate information is the third license plate information. For example, the image analysis system may identify in the third image a vehicle whose license plate information is the third license plate information by using any image identification method and determine the identified license as a target vehicle.

After identifying the target vehicle included in the third image, the image analysis system may further determine position information of an area in the third image occupied by the target vehicle. For example, the image analysis system may create a coordinate system in the third image, thereby determine a starting point and an ending point in the X direction, and a starting point and an ending point in the Y direction of the area in the third image occupied by the target vehicle, and determine the determined position information as initial area information of the third image.

S303: storing a correspondence between the identification information of the image acquisition device and the initial area information.

After determining initial area information of the third image, the image analysis system may store a correspondence between identification information of the image acquisition device and the initial area information. For example, the identification information of the image acquisition device and the initial area information may be stored locally by the image analysis system, or may be stored in an external device that establishes a connection with the image analysis system.

Optionally, the image analysis system may store, for each image acquisition device, initial area information corresponding to identification information of each image acquisition device in group. For example, the correspondence between the identification information of each image acquisition device and the initial area information stored by the image analysis system may be as shown in Table 2:

TABLE 2

| identification information | area information |
|---|---|
| 01 | X(120,143), Y(12,56) |
| | X(110145), Y(15,58) |
| | X(123,151), Y(13,53) |
| 02 | X(112,232), Y(21,53) |
| | X(117,235), Y(28,55) |
| 03 | X(23,83), Y(14,49) |
| | X(25,86), Y(18,46) |
| ... | ... |

S304: determining and storing, according to respective initial area information corresponding to the identification information of the image acquisition device, area information corresponding to the image acquisition device, when the number of pieces of the initial area information corresponding to the image acquisition device is greater than a second preset threshold.

The image analysis system may determine and store, according to respective initial area information corresponding to the identification information of the image acquisition device, area information corresponding to the image acquisition device, when the number of pieces of the initial area information corresponding to the image acquisition device is greater than a second preset threshold, such as, 5000, 10000, 20000, etc. Specifically, the image analysis system may determine, based on a statistical result or a feature matching result for multiple initial area information corresponding to the image acquisition device, area information corresponding to the image acquisition device.

In one implementation, the image analysis system determining, based on a statistical result or a feature matching result for multiple initial area information corresponding to the image acquisition device, area information corresponding to the image acquisition device may include firstly determining an initial area respectively corresponding to each initial area information, then determining a target area coveting respective initial area, and determining position information of the target area as area information corresponding to the image acquisition device.

According to the correspondence between the identification information of each image acquisition device and the initial area information shown in Table 2, the determined correspondence between the identification information of each image acquisition device and the area information may be shown in Table 3:

TABLE 3

| identification information | area information |
|---|---|
| 01 | X(110,151), Y(12,53) |
| 02 | X(112,235), Y(21,55) |
| 03 | X(23,86), Y(14,49) |
| ... | ... |

The image analysis system may further count initial area information with the highest frequency of occurrence in multiple initial area information, and determine that initial area information as area information corresponding to the image acquisition device. Alternatively, the image analysis system may determine target area with the highest overlap rate in initial area corresponding to the multiple initial area information, and determine position information of the target area as area information corresponding to the image acquisition device. Alternatively, the image analysis system may determine a center point of the initial area corresponding to respective initial area information, then determine a target area with a center of the center point and a preset size of a license plate, and determine position information of the target area as area information corresponding to the image acquisition device.

In one implementation, the image analysis system may obtain a feature matching result for multiple initial area information corresponding to the image acquisition device by using the SIFT algorithm as area information corresponding to the image acquisition device.

In the embodiment, the image analysis system may pre-store a correspondence between each image acquisition device and respective area information, thereby, when a first image sent by target image acquisition device is received, the image analysis system may determine a second image corresponding to area information of a target image acquisition device, and analyze the second image. Since the size of the second image is smaller than the first image, the efficiency of analyzing an image can be increased.

Corresponding to the above method embodiment, an embodiment of the present application provides a corresponding apparatus embodiment.

Figure 8:
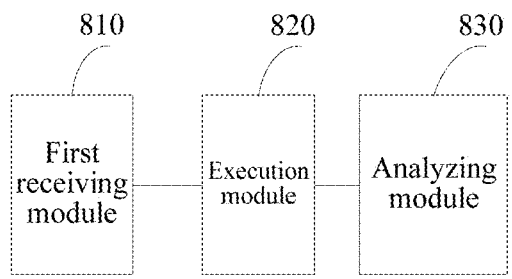
FIG. 8 is a schematic structure diagram of an image analysis apparatus according to an embodiment of the present application.

FIG. 8 shows an image analysis apparatus according to the embodiment of the present application, which includes:

a first receiving module 810, configured for receiving target information sent by a target image acquisition device; wherein, the target information at least comprises: a first image acquired by the target image acquisition device, and identification information of the target image acquisition device;

an execution module 820, configured for obtaining, according to a pre-stored correspondence between identification information of each image acquisition device and area information, target area information corresponding to the identification information of the target image acquisition device; and an analyzing module 830, configured for determining a second image corresponding to the target area information in the first image, and analyzing the second image.

In the embodiment of the present application, for one image acquisition device, an area where target vehicles in the acquired images are located is usually relatively fixed. Therefore, a correspondence between identification information and area information of each image acquisition device can be obtained in advance. The above area information includes position information of an area where a target vehicle in the image acquired by each image acquisition device is located. After an image sent by a target image acquisition device is received, a second image corresponding to target area information may be determined according to target area information corresponding to a target image acquisition device, and only the second image is analyzed. Since the size of the second image is smaller than the first image, the efficiency of analyzing an image can be increased.

Figure 9:
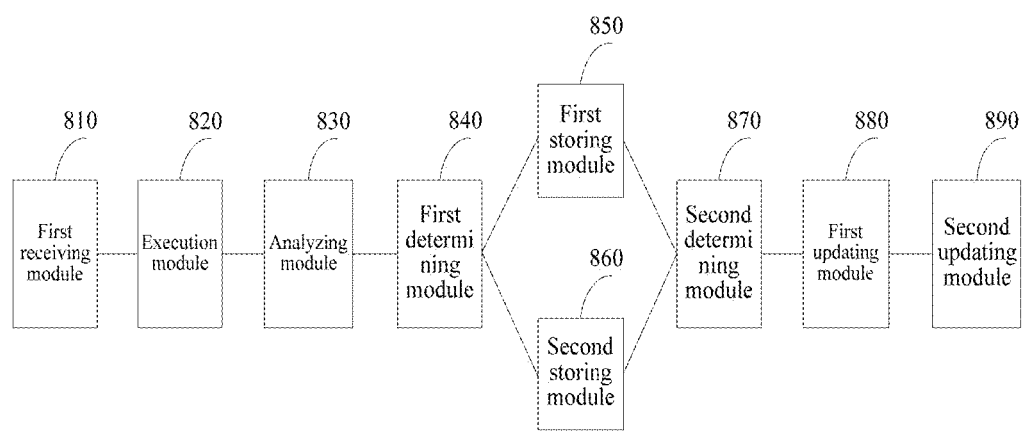
FIG. 9 is another schematic structure diagram of an image analysis apparatus according to an embodiment of the present application.

As an implementation of the embodiment of the present application, the target information further comprises: a first license plate information of a target vehicle in the first image; the analyzing module is specifically configured for identifying second license plate information in the second image; as shown in FIG. 9, the apparatus further includes:

a first determining module 840, configured for determining whether the first license plate information is the same as the second license plate information;

a first storing module 850, configured for, when a determining result from the first determining module 840 is yes, analyzing the second image to determine first area information of the second image, and storing correspondingly the identification information of the target image acquisition device, the first area information of the second image and a first determining result, which indicates that the first license plate information is the same as the second license plate information;

a second storing module 860, configured for, when a determining result from the first determining module 840 is no, analyzing the first image to determine first area information of the first image, and storing correspondingly the identification information of the target image acquisition device, the first area information of the first image and a second determining result, which indicates that the first license plate information is different from the second license plate information.

As an implementation of the embodiment of the present application, the first storing module 850 includes:

a first identifying sub-module (not shown in the figure), configured for identifying in the second image a target vehicle whose license plate information is the first license plate information;

a first determining sub-module (not shown in the figure), configured for determining position information of an area in the second image occupied by the target vehicle, and determining the position information as the first area information of the second image.

As an implementation of the embodiment of the present application, the second storing module 860 includes:

a second identifying sub-module (not shown in the figure), configured for identifying in the first image a target vehicle whose license plate information is the first license plate information;

a second determining sub-module (not shown in the figure), configured for determining position information of an area in the first image occupied by the target vehicle, and determining the position information as the first area information of the first image.

As an implementation of the embodiment of the present application, as shown in FIG. 9, the apparatus further include:

a second determining module 870, configured for determining, at a set time interval, whether the number of the second determining results stored during a first preset time period is greater than a first preset threshold;

a first updating module 880, configured for, when a determining result from the second determining module 870 is yes, updating area information corresponding to the identification information of the target image acquisition device according to the identification information of the target image acquisition device and the first area information of the first image corresponding to the second determining results stored during a second preset time period;

a second updating module 890, configured for, when a determining result from the second determining module 870 is no, updating area information corresponding to the identification information of the target image acquisition device according to the identification information of the target image acquisition device and the first area information of the second image corresponding to the first determining results stored during a third preset time period.

As an implementation of the embodiment of the present application, the first updating module 880 includes:

a first obtaining sub-module (not shown in figure), configured for obtaining, from the second determining results stored during the second preset time period, first area information of multiple first images corresponding to the identification information of the target image acquisition device;

a third determining sub-module (not shown in figure), configured for determining second area information based on a statistical result for the first area information of the multiple first images or based on a feature matching result for the first area information of the multiple first images;

a first updating sub-module (not shown in figure), configured for updating, according to the determined second area information, area information corresponding to the identification information of the target image acquisition device.

As an implementation of the embodiment of the present application, the second updating module 890 includes:

a second obtaining sub-module (not shown in figure), configured for obtaining, from the first determining results stored during the third preset time period, first area information of multiple second images corresponding to the identification information of the target image acquisition device;

a fourth determining sub-module (not shown in figure), configured for determining second area information based on a statistical result for the first area information of the multiple second images or based on a feature matching result for the first area information of the multiple second images; and a second updating sub-module (not shown in figure), configured for updating, according to the determined second area information, area information corresponding to the identification information of the target image acquisition device.

Figure 10:
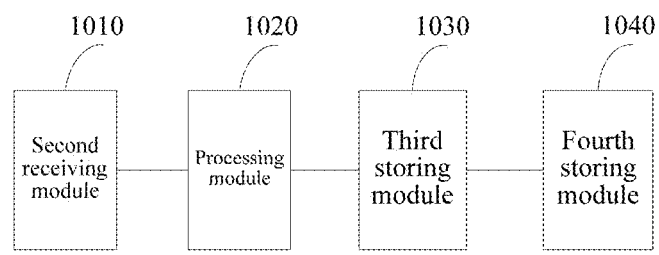
FIG. 10 is another schematic structure diagram of an image analysis apparatus according to an embodiment of the present application.

As an implementation of the embodiment of the present application, as shown in FIG. 10, the apparatus further include:

a second receiving module 1010, configured for receiving, for each image acquisition device, a third image, third license plate information of a target vehicle included in the third image, and identification information of the image acquisition device sent by the image acquisition device;

a processing module 1020, configured for identifying in the third image a target vehicle whose license plate information is the third license plate information, determining position information of an area in the third image occupied by the target vehicle, and determining the position information as initial area information of the third image;

a third storing module 1030, configured for storing a correspondence between the identification information of the image acquisition device and the initial area information; and a fourth storing module 1040, configured for determining and storing area information corresponding to the image acquisition device according to initial area information corresponding to the identification information of the image acquisition device, when the number of pieces of the initial area information corresponding to the image acquisition device stored by the third storing module is greater than a second preset threshold.

In the embodiment of the present application, only the second image including a specific area of the first image can be analyzed. Since the size of the second image is smaller than the first image, the efficiency of analyzing an image can be increased.

The embodiment of the present application further provides an electronic device, which may include a processor and a memory;

the memory stores executable program codes;

the processor runs a program corresponding to the executable program codes by reading the executable program codes stored in the memory to implement the image analysis method described above.

Figure 11:
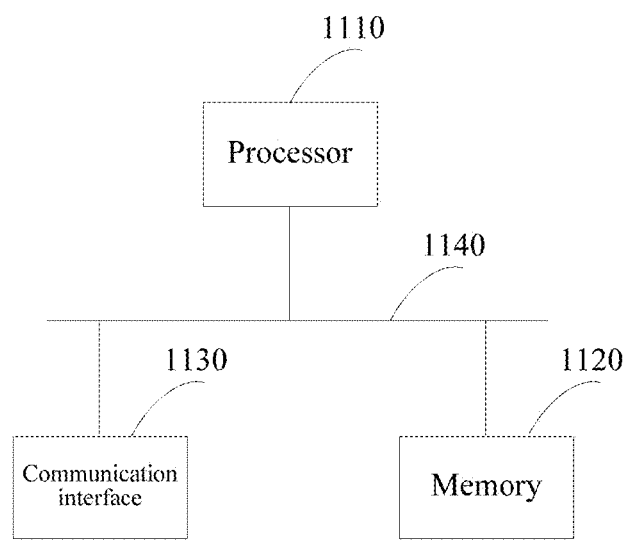
FIG. 11 is a schematic structure diagram of an electronic device according to an embodiment of the present application.

Correspondingly, as shown in FIG. 11, an embodiment of the present application further provides an electronic device, the device may include:

a processor 1110, a memory 1120, a communication interface 1130 and a bus 1140;

the processor 1110, the memory 1120 and the communication interface 1130 are connected and communicate with each other via the bus 1140;

the memory 1120 stores executable program codes;

the processor 1110 runs a program corresponding to the executable gram codes by reading the executable program codes stored in the memory 1120, to implement the image analysis method described in the present application. The image analysis method includes:

receiving target information sent by a target image acquisition device; wherein, the target information at least comprises: a first image acquired by the target image acquisition device, and identification information of the target image acquisition device;

obtaining, according to a pre-stored correspondence between identification information of each image acquisition device and area information, target area information corresponding to the identification information of the target image acquisition device; and determining a second image corresponding to the target area information in the first image, and analyzing the second image.

In the embodiment of the present application, for one image acquisition device, an area where target vehicles in the acquired images are located is usually relatively fixed. Therefore, a correspondence between identification information and area information of each image acquisition device can be obtained in advance. The above area information includes position information of an area where a target vehicle in the image acquired by each image acquisition device is located. After an image sent by a target image acquisition device is received, a second image corresponding to target area information may be determined according to target area information corresponding to a target image acquisition device, and only the second image is analyzed. Since the size of the second image is smaller than the first image, the efficiency of analyzing an image can be increased.

Correspondingly, an embodiment of the present application further provides a storage medium, wherein the storage medium is configured for storing executable program codes, which are executed to implement the image analysis method according to the embodiments of the present application, wherein the image analysis method includes:

receiving target information sent by a target image acquisition device; wherein, the target information at least comprises: a first image acquired by the target image acquisition device, and identification information of the target image acquisition device;

obtaining, according to a pre-stored correspondence between identification information of each image acquisition device and area information, target area information corresponding to the identification information of the target image acquisition device; and determining a second image corresponding to the target area information in the first image, and analyzing the second image.

In an embodiment of the present application, for one image acquisition device, an area where target vehicles in the acquired images are located is usually relatively fixed. Therefore, a correspondence between identification information and area information of each image acquisition device can be obtained in advance. The above area information includes position information of an area where a target vehicle in the image acquired by each image acquisition device is located. After an image sent by a target image acquisition device is received, a second image corresponding to target area information may be determined according to target area information corresponding to a target image acquisition device, and only the second image is analyzed. Since the size of the second image is smaller than the first image, the efficiency of analyzing an image can be increased.

Correspondingly, an embodiment of the present application further provides an application, wherein the application is executed to implement the image analysis method according to the embodiment of the present application. The image analysis method includes:

receiving target information sent by a target image acquisition device; wherein, the target information at least comprises: a first image acquired by the target image acquisition device, and identification information of the target image acquisition device;

obtaining, according to a pre-stored correspondence between identification information of each image acquisition device and area information, target area information corresponding to the identification information of the target image acquisition device; and determining a second image corresponding to the target area information in the first image, and analyzing the second image.

In an embodiment of the present application, for one image acquisition device, an area where target vehicles in the acquired images are located is usually relatively fixed. Therefore, a correspondence between identification information and area information of each image acquisition device can be obtained in advance. The above area information includes position information of an area where a target vehicle in the image acquired by each image acquisition device is located. After an image sent by a target image acquisition device is received, a second image corresponding to target area information may be determined according to target area information corresponding to a target image acquisition device, and only the second image is analyzed. Since the size of the second image is smaller than the first image, the efficiency of analyzing an image can be increased.

For embodiments of the apparatus, electronic device, storage medium, application, since they are similar to the embodiments of the method, the description thereof is relatively simple; the relating parts could refer to the parts of the description of embodiments of the method.

It should be noted that the relationship terms herein such as "first", "second", and the like are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a." or "include(s) a." do not exclude that there are other identical elements in the processes, methods, articles, or devices which include these elements.

All the embodiments are described in corresponding ways, same or similar parts in each of the embodiments can be referred to one another, and the parts emphasized are differences to other embodiments. Especially for embodiments of a device, since they are similar to embodiments of a method, the description thereof is relatively simple; the relating parts could refer to the parts of the description of embodiments of the method.

It will be understood by those of ordinary skills in the art that all or some of the steps in the methods described above may be accomplished by a program to instruct the associated hardware. Said program may be stored in a computer-readable storage medium, such as ROMs/RAMs, magnetic disks, optical disks, etc.

The embodiments described above are merely preferred embodiments of the present application, and not intended to limit the scope of the present application. Any modifications, equivalents, improvements or the like within the spirit and principle of the application should be included in the scope of the application.

What is claimed is:

1. An image analysis method, comprising:
   receiving target information sent by a target image acquisition device; wherein, the target information at least comprises: a first image acquired by the target image acquisition device, and identification information of the target image acquisition device;
   storing a correspondence between identification information of each image acquisition device and area information;
   obtaining, according to the stored correspondence between identification information of each image acquisition device and area information, target area information corresponding to the identification information of the target image acquisition device; and
   determining a second image corresponding to the target area information in the first image, and analyzing the second image.

2. The method of claim 1, wherein, the target information further comprises: a first license plate information of a target vehicle in the first image; analyzing the second image at least comprises:
   identifying second license plate information in the second image;
   the method further comprises:
   determining whether the first license plate information is the same as the second license plate information;
   if yes, analyzing the second image to determine first area information of the second image, and storing correspondingly the identification information of the target image acquisition device, the first area information of the second image and a first determining result, which indicates that the first license plate information is the same as the second license plate information;
   if not, analyzing the first image to determine first area information of the first image, and storing correspondingly the identification information of the target image acquisition device, the first area information of the first image and a second determining result, which indicates that the first license plate information is different from the second license plate information.

3. The method according to claim 2, wherein, determining the first area information of the second image comprises:
   identifying in the second image a target vehicle whose license plate information is the first license plate information;
   determining position information of an area in the second image occupied by the target vehicle, and determining the position information as the first area information of the second image.

4. The method of claim 2, wherein, determining the first area information of the first image comprises:
   identifying in the first image a target vehicle whose license plate information is the first license plate information;
   determining position information of an area in the first image occupied by the target vehicle, and determining the position information as the first area information of the first image.

5. The method of claim 2, further comprising:
   determining, at a set time interval, whether the number of the second determining results stored during a first preset time period is greater than a first preset threshold;
   if yes, updating area information corresponding to the identification information of the target image acquisition device according to the identification information of the target image acquisition device and the first area information of the first image corresponding to the second determining results stored during a second preset time period;
   if not, updating area information corresponding to the identification information of the target image acquisition device according to the identification information of the target image acquisition device and the first area information of the second image corresponding to the first determining results stored during a third preset time period.

6. The method of claim 5, wherein, updating the area information corresponding to the identification information of the target image acquisition device according to the identification information of the target image acquisition device and the first area information of the first image corresponding to the second determining results stored during a second preset time period comprises:
   obtaining, from the second determining results stored during the second preset time period, first area information of multiple first images corresponding to the identification information of the target image acquisition device;
   determining second area information based on a statistical result for the first area information of the multiple first images or based on a feature matching result for the first area information of the multiple first images; and
   updating, according to the determined second area information, area information corresponding to the identification information of the target image acquisition device.

7. The method of claim 5, wherein, updating area information corresponding to the identification information of the target image acquisition device according to the identification information of the target image acquisition device and the first area information of the second image corresponding to the first determining results stored during a third preset time period comprises:
  obtaining, from the first determining results stored during the third preset time period, first area information of multiple second images corresponding to the identification information of the target image acquisition device;
  determining second area information based on a statistical result for the first area information of the multiple second images or based on a feature matching result for the first area information of the multiple second images; and
  updating, according to the determined second area information, area information corresponding to the identification information of the target image acquisition device.

8. The method of claim 1, wherein, storing a correspondence between identification information of each image acquisition device and area information comprises:
  receiving, for each image acquisition device, a third image, third license plate information of a target vehicle included in the third image, and identification information of the image acquisition device sent by the image acquisition device;
  identifying in the third image a target vehicle whose license plate information is the third license plate information, determining position information of an area in the third image occupied by the target vehicle, and determining the position information as initial area information of the third image;
  storing a correspondence between the identification information of the image acquisition device and the initial area information; and
  determining and storing area information corresponding to the image acquisition device according to initial area information corresponding to the identification information of the image acquisition device, when the number of pieces of the initial area information corresponding to the image acquisition device is greater than a second preset threshold.

9. An electronic device, comprising:
  a processor and a memory;
  the memory stores executable program codes;
  the processor runs a program corresponding to the executable program codes by reading the executable program codes stored in the memory to implement the image analysis method of claim 1.

10. An image analysis apparatus, comprising:
  a first receiving module, configured for receiving target information sent by a target image acquisition device; wherein, the target information at least comprises: a first image acquired by the target image acquisition device, and identification information of the target image acquisition device;
  a third storing module, configured for storing a correspondence between the identification information of the image acquisition device and the initial area information;
  an execution module, configured for obtaining, according to the stored correspondence between identification information of each image acquisition device and area information, target area information corresponding to the identification information of the target image acquisition device; and
  an analyzing module, configured for determining a second image corresponding to the target area information in the first image, and analyzing the second image.

11. The apparatus of claim 10, wherein, the target information further comprises: a first license plate information of a target vehicle in the first image; the analyzing module is configured for identifying second license plate information in the second image;
  the apparatus further comprises:
  a first determining module, configured for determining whether the first license plate information is the same as the second license plate information;
  a first storing module, configured for, when a determining result from the first determining module is yes, analyzing the second image to determine first area information of the second image, and storing correspondingly the identification information of the target image acquisition device, the first area information of the second image and a first determining result, which indicates that the first license plate information is the same as the second license plate information;
  a second storing module, configured for, when a determining result from the first determining module is no, analyzing the first image to determine first area information of the first image, and storing correspondingly the identification information of the target image acquisition device, the first area information of the first image and a second determining result, which indicates that the first license plate information is different from the second license plate information.

12. The apparatus of claim 11, wherein, the first storing module comprises:
  a first identifying sub-module, configured for identifying in the second image a target vehicle whose license plate information is the first license plate information;
  a first determining sub-module, configured for determining position information of an area in the second image occupied by the target vehicle, and determining the position information as the first area information of the second image.

13. The apparatus of claim 11, wherein, the second storing module comprises:
  a second identifying sub-module, configured for identifying in the first image a target vehicle whose license plate information is the first license plate information;
  a second determining sub-module, configured for determining position information of an area in the first image occupied by the target vehicle, and determining the position information as the first area information of the first image.

14. The apparatus of claim 11, further comprising:
  a second determining module, configured for determining, at a set time interval, whether the number of the second determining results stored during a first preset time period is greater than a first preset threshold;
  a first updating module, configured for, when a determining result from the second determining module is yes, updating area information corresponding to the identification information of the target image acquisition device according to the identification information of the target image acquisition device and the first area information of the first image corresponding to the second determining results stored during a second preset time period;

a second updating module, configured for, when a determining result from the second determining module is no, updating area information corresponding to the identification information of the target image acquisition device according to the identification information of the target image acquisition device and the first area information of the second image corresponding to the first determining results stored during a third preset time period.

15. The apparatus of claim 14, wherein, the first updating module comprises:
   a first obtaining sub-module, configured for obtaining, from the second determining results stored during the second preset time period, first area information of multiple first images corresponding to the identification information of the target image acquisition device;
   a third determining sub-module, configured for determining second area information based on a statistical result for the first area information of the multiple first images or based on a feature matching result for the first area information of the multiple first images; and
   a first updating sub-module, configured for updating, according to the determined second area information, area information corresponding to the identification information of the target image acquisition device.

16. The apparatus of claim 14, wherein, the second updating module comprises:
   a second obtaining sub-module, configured for obtaining, from the first determining results stored during the third preset time period, first area information of multiple second images corresponding to the identification information of the target image acquisition device;
   a fourth determining sub-module, configured for determining second area information based on a statistical result for the first area information of the multiple second images or based on a feature matching result for the first area information of the multiple second images; and
   a second updating sub-module, configured for updating, according to the determined second area information, area information corresponding to the identification information of the target image acquisition device.

17. The apparatus of claim 10, further comprising:
   a second receiving module, configured for receiving, for each image acquisition device, a third image, third license plate information of a target vehicle included in the third image, and identification information of the image acquisition device sent by the image acquisition device;
   a processing module, configured for identifying in the third image a target vehicle whose license plate information is the third license plate information, determining position information of an area in the third image occupied by the target vehicle, and determining the position information as initial area information of the third image; and
   a fourth storing module, configured for determining and storing area information corresponding to the image acquisition device according to initial area information corresponding to the identification information of the image acquisition device, when the number of pieces of the initial area information corresponding to the image acquisition device stored by the third storing module is greater than a second preset threshold.

* * * * *